United States Patent [19]

Lang

[11] 3,832,849
[45] Sept. 3, 1974

[54] SERVO STEERING DEVICE, ESPECIALLY FOR AUTOMOBILES

[75] Inventor: Armin Lang, Schwabisch Gmund-Bettringen, Germany

[73] Assignee: Zahnradfabrik Friedrichshafen AG, Friedrichshafen, Germany

[22] Filed: July 5, 1973

[21] Appl. No.: 376,372

[30] Foreign Application Priority Data
July 6, 1972  Germany............................ 2233167

[52] U.S. Cl........................ 60/386, 60/403, 91/412, 180/79.2
[51] Int. Cl........................ F15b 20/00, B62d 5/06
[58] Field of Search ............ 60/386, 403, 404, 405, 60/486; 91/412; 180/79.2

[56] References Cited
UNITED STATES PATENTS

| | | |
|---|---|---|
| 2,616,264 | 11/1952 | Grant et al............................ 91/412 |
| 3,016,708 | 1/1962 | Gordon et al...................... 60/386 X |
| 3,270,507 | 9/1966 | Mercier et al. ...................... 60/403 |
| 3,554,089 | 1/1971 | Lang.................................... 91/412 |

Primary Examiner—Edgar W. Geoghegan

[57] ABSTRACT

A hydrostatic servo operated steering system having primary and shunt motors connected to the steering linkage under control of steering wheel and pressure operated valves to effect a change in steering effort in order to meet changes in load or resistance. A shuttle valve responsive to a pressure differential between the output of the engine driven servo pump and the pressure applied to the primary servo motor, controls supply of operating pressure medium to the shunt motor from either the servo motor or the steering wheel actuated control pump in the event the servo pump fails.

3 Claims, 2 Drawing Figures

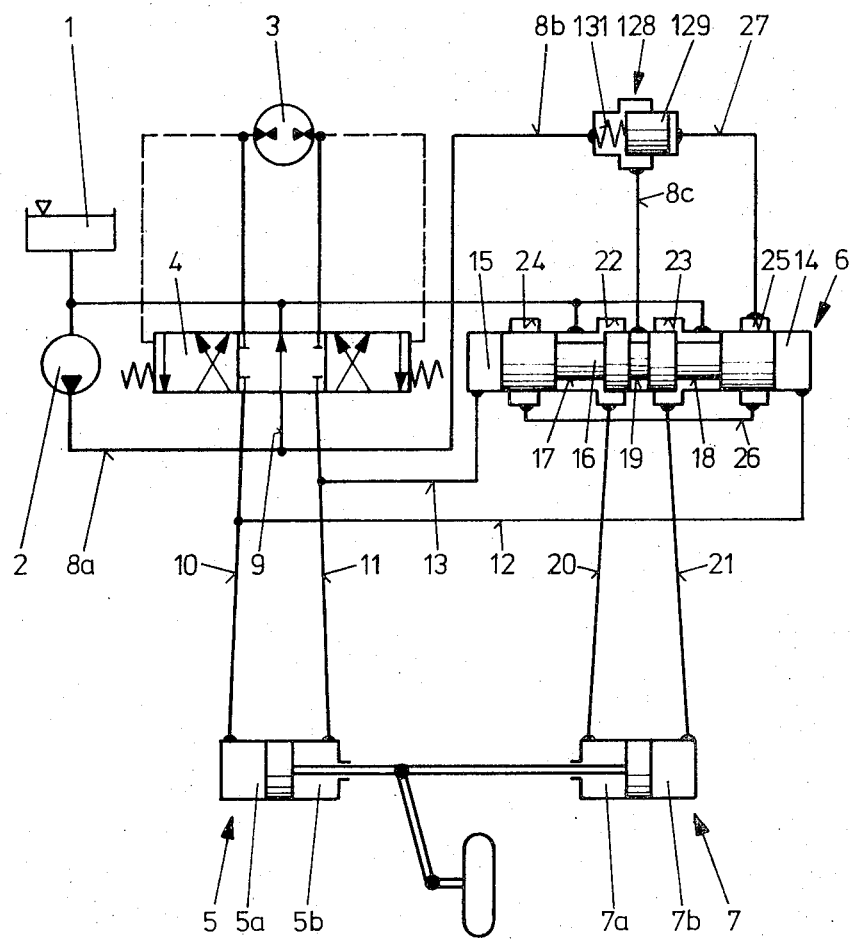

SERVO STEERING DEVICE, ESPECIALLY FOR AUTOMOBILES

This invention relates to a servo steering system for automotive vehicles wherein the steering force is hydrostatically transmitted through an operating medium pressurized by an engine driven servo pump, the pressure medium being conducted through a steering control valve and control pump acting as a metering device, with at least two servo motors applying the steering effort to the vehicle wheels at a changing rate to accommodate variations in the steering resistance. This application is related to prior co-pending application, U.S. Ser. No. 269,460, filed July 6, 1972, now U.S. Pat. No. 3,765,181, granted Oct. 16, 1973.

In a hydrostatic servo steering system of the type disclosed in the prior co-pending application aforementioned and also disclosed in my prior U.S. Pat. No. 3,554,089, a change in the steering load or resistance automatically produces a change in the rate of steering motion by activating or deactivating a shunt motor supplied with fluid from the servo pump through a shunt valve. If the servo pump fails, pressure medium is then supplied through the shunt valve to the shunt motor from the steering wheel operated control pump according to the disclosure in the prior co-pending application aforementioned. This is accomplished by a system of spring biased check valves associated with the shunt valve which therefore involves modification of the shunt valve as disclosed in my prior U.S. Pat. No. 3,554,089 aforementioned. The present invention is therefore also addressed to the problem of supplying pressure medium to the shunt motor in the event the servo pump fails but avoids the check valve modification disclosed in the prior co-pending application aforementioned.

The present invention effects a solution to the problem of servo pump failure by featuring a supply conduit connecting the servo pump to a shuttle valve, the shuttle valve being actuated by a pressure differential between the supply conduit and two interconnected control ports of the shunt valve which is appropriately modified as compared to the shunt valve disclosed in my prior U.S. Pat. No. 3,554,089. In this manner, pressure medium originating from the steering wheel operated control pump will be applied to the shunt valve in the event the engine driven servo pump fails while supply from the servo pump is assured whenever it is operating regardless of the pressure generated by the control pump.

The invention and additional characteristics thereof are described in more detail hereafter with reference to the drawings in which:

FIG. 2 is a schematic fluid circuit diagram representing a second embodiment of the invention.

Figure 1:
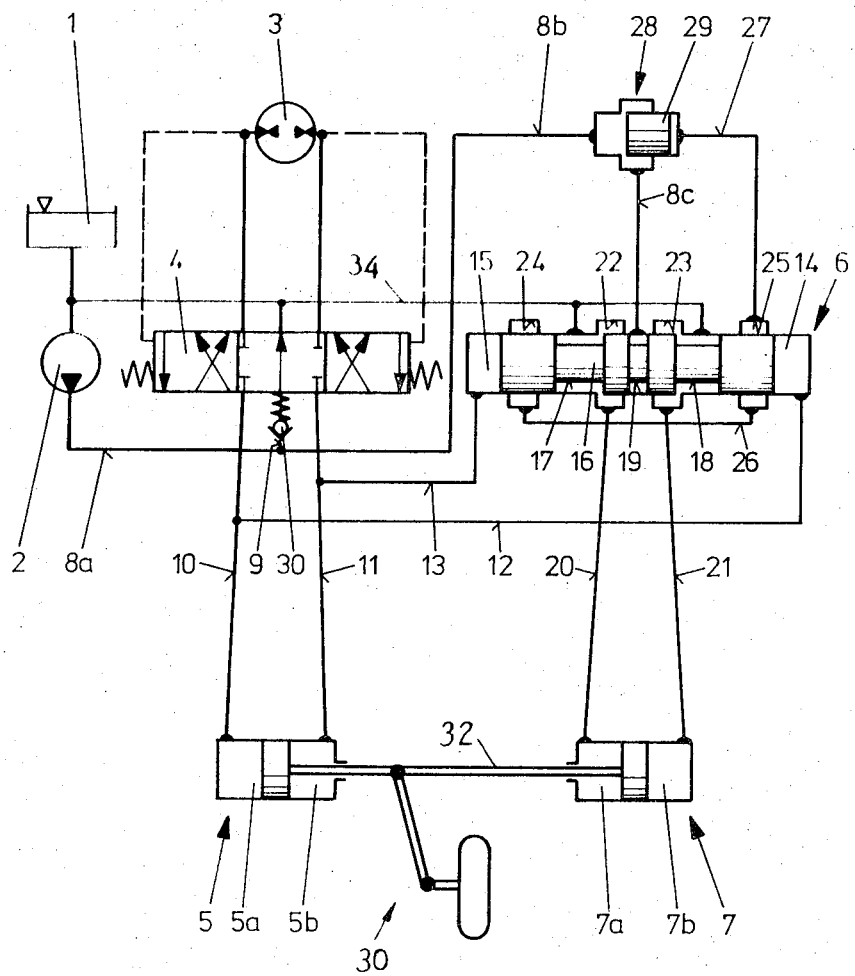
FIG. 1 is a schematic fluid circuit diagram representing one embodiment of the invention.

The servo steering system illustrated in FIG. 1 includes a reservoir 1 from which fluid is drawn by an engine driven servo pump 2. A control pump 3 and an associated control valve 4 are both operated by a steering wheel (not shown) in a manner well known to those skilled in the art. A primary servo motor 5 is connected to the steering linkage 30 through its piston rod 32 under control of the control valve 4. Also connected to the piston rod 32, is a shunt motor 7 under control of a shunt valve 6 through which fluid is normally supplied to the shunt motor from the servo pump in accordance with changes in the steering resistance producing a change in the rate of steering motion as disclosed in my prior U.S. patent and co-pending application aforementioned.

The outlet of servo pump 2 is connected by supply conduits 8a and 9 to the control valve 4 and through conduits 8a, 8b, and 8c to shunt valve 6. Two conduits 10 and 11 connect the control valve 4 to the servo motor 5. Differential pressures prevailing in opposing pressure chambers 5a and 5b of servo motor 5 are transmitted by two pressure lines 12 and 13 to two end control chambers 14 and 15 of the shunt valve 6. A piston 16 in shunt valve 6 subject to the pressures in chambers 14 and 15, is provided with two control grooves 17 and 18 and an intermediate control groove 19 to control flow through the various ports in the valve body of shunt valve 6. Two outlet conduits 20 and 21 connect ports 22 and 23 of the valve to chambers 7a and 7b of the shunt motor 7. Two control ports 24 and 25 in the valve body of valve 6 are interconnected by a conduit 26 and, through conduit 27, are connected to a shuttle valve 28. The shuttle valve is disposed between conduit sections 8b and 8c of the supply conduit 8 through which the pressure medium is supplied from the servo pump through the shunt valve to the shunt motor 7.

When servo pump 2 is delivering pressure medium, piston 29 of the shuttle valve is displaced to one of its end positions as shown in FIG. 1 of the drawings because of the pressure prevailing in conduits 8a and 8b resulting in the supply of pressure medium to the shunt motor through conduit section 8c. A spring loaded check valve 30 disposed in conduit 9 upstream of the control pump 3, closes under its spring bias when the pressure of the operating medium supplied to conduits 10 and 11 through the control valve and the control pump approaches that in supply conduit 8. The pressure in conduit 10 or 11 is thereby reduced relative to the delivering pressure of servo pump 2 in conduit 8. This insures that the pressure in conduit 8b will be higher than the pressure in conduit 27 when the servo pump 2 is operating so that piston 29 of the shuttle valve 28 will be held in the end position shown in FIG. 1.

When the servo pump 2 fails, there will be no pressure in conduits 8a and 8b. The pressure differential applied to the chambers 14 and 15 in shunt valve 6 upon actuation of control pump 3, displaces piston 16 and the pressure developed by control pump 3 is then transmitted to conduit 27 through chamber 14 or through chamber 15 and conduit 26. Piston 29 of the shuttle valve 28 is then shifted to its other end position so that the shunt valve 6 and shunt motor 7 will receive pressure medium from the control pump 3 through conduits 27 and 8c and port 22 or 23.

FIG. 2 illustrates a second embodiment that is similar in arrangement and operation to the first described embodiment except that the check valve 30 is eliminated in favor of a spring 131 biasing piston 129 in the shuttle valve 128 to the end position shown. Should the servo pump 2 fail, the steering force applied by the control pump 3 must be sufficient so that the pressure of the medium supplied therefrom to the shuttle valve through conduit 27 overcomes the bias of the spring 131.

As a result of the servo steering system hereinbefore described involving the shuttle valve 28 or 128, the steerability of a vehicle is more completely assured in the event of failure of the servo pump 2. Further, an increase in steering effort is obtained and the manual force required for turning the steering wheel is diminished.

The foregoing description of the servo steering system omits the usual pressure and flow limiting valves for the pressure line, the followup valve and safety valves that may be required for volume balance of the chambers in the servo motors. These valves are not relevant to the novel operational attributes of the invention and are therefore omitted in order to avoid unnecessary complexity in the description.

What is claimed is:

1. In a hydrostatic servo steering system including an engine driven servo pump 2 supplying an operating pressure medium through a control valve 4 and a metering control pump 3 to a servo motor 5 and a shunt motor 7 to which said pressure medium is supplied through a shunt valve 6 having control ports 24 and 25 through which pressure medium from the control valve is conducted, means for supplying said pressure medium to the shunt motor from the control pump in the event the servo pump fails, comprising a pressure supply conduit 8 connecting the servo pump to the shunt valve, passage means 9 interconnecting the supply conduit with the control valve for conducting the pressure medium to the servo motor, and shuttle valve means 28 connected to the control ports of the shunt valve and responsive to a pressure differential between said supply conduit and the control ports for conducting the pressure medium to the shunt valve from either the supply conduit or the control pump through the control valve.

2. The combination of claim 1 including a spring biased check valve 30 in the passage means for reducing the pressure of the medium supplied to the shuttle valve means from the control port relative to the pressure in the supply conduit while the servo pump is operating.

3. The combination of claim 1 wherein said shuttle valve means 128 includes a spring 131 opposing the pressure of the medium supplied from the control port.

* * * * *